(12) United States Patent
Kumar et al.

(10) Patent No.: US 7,684,319 B2
(45) Date of Patent: Mar. 23, 2010

(54) TRANSMISSION CONTROL PROTOCOL CONGESTION WINDOW

(75) Inventors: Alok Kumar, Santa Clara, CA (US); Eswar M. Eduri, Santa Clara, CA (US); Prashant Chandra, Santa Clara, CA (US); Uday Naik, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 11/480,180

(22) Filed: Jun. 29, 2006

(65) Prior Publication Data

US 2008/0002575 A1 Jan. 3, 2008

(51) Int. Cl.
*H04J 1/16* (2006.01)
(52) U.S. Cl. .................. 370/229; 370/235; 370/236
(58) Field of Classification Search .......... 370/432, 370/390, 352, 324, 503, 389, 350, 304, 507, 370/509, 510, 511, 512, 513, 514, 395.62, 370/229, 230, 230.1, 231, 232, 235, 235.1, 370/236, 252
See application file for complete search history.

(56) References Cited

U.S. PATENT DOCUMENTS

| | | | | |
|---|---|---|---|---|
| 6,081,568 | A * | 6/2000 | Oda | 375/358 |
| 6,961,539 | B2 * | 11/2005 | Schweinhart et al. | 455/12.1 |
| 7,035,291 | B2 * | 4/2006 | Grinfeld | 370/503 |
| 2002/0054570 | A1 * | 5/2002 | Takeda | 370/252 |
| 2002/0080721 | A1 * | 6/2002 | Tobagi et al. | 370/236 |
| 2002/0145976 | A1 * | 10/2002 | Meyer et al. | 370/235 |
| 2002/0150048 | A1 * | 10/2002 | Ha et al. | 370/231 |
| 2004/0240473 | A1 | 12/2004 | Kumar et al. | |
| 2005/0135353 | A1 | 6/2005 | Chandra et al. | |

OTHER PUBLICATIONS

Intel IXP2400 Network Processor For OC-48/2.5 Gbps Network Access and Edge Applications; Product Brief; Copyright 2003 Intel Corporation; 279053-002; 6 pages.
Jacobsen, et al: congestion Avoidance and Control; slightly revised from paper presented @ SIGCOMM '88[12] Stanford, CA; Nov. 1988; pp. 1-25.
FreeBSD: src/sys/netinet/tcp_input.c,v 1.107.2.20; Dec. 14, 2001; copyright 1995 the Regents of the Univ. of CA; 53 pages.
Lauritzen, et al: Intel I/O Accelaration Technology Inmproves Network Performance, Reliability ad Efficiently; Technology@Intel MagazineMar. 2005; pp. 1-11.
Darpa Internet Program, Protocol Specification, Transmission Control Protocol; RFC: 793; Infor. Scientces Institute, U. of Southern CA; 106 pages.

(Continued)

*Primary Examiner*—Jason E Mattis
*Assistant Examiner*—Dady Chery
(74) *Attorney, Agent, or Firm*—Grossman, Tucker, Perreault & Pfleger, PLLC

(57) ABSTRACT

Techniques for managing a TCP congestion window. Such techniques include incrementing an acknowledgement (ACK) count for non-duplicate Transmission Control Protocol ACKs received, comparing the ACK count to a congestion window factor representing the ratio of a congestion window size associated with a connection to a maximum segment size associated with the connection, and, based on the comparing, incrementing the congestion window factor.

15 Claims, 6 Drawing Sheets

OTHER PUBLICATIONS

Nagle: congestion control in IP/TCP Internetworks, RFC: 896; Network Working Group; Jan. 6, 1984; 16 pages.

Braden: Requirements for Internet Hosts—communication Layers; network Working Group RFC 1122; Oct. 1989; pp. 1-116.

Addressing TCP/IP Processing challengs Using the IA and IXP PRocessors; Intel Tech Journal Communications Processing, vol. 7 Iss. 4, Nov. 14, 2003; ISSN 1535-864X, pp. 39-50.

Minturn et al: Communications Processing, addressing TCP?IP Processing Challenges Using the IA and IXP Processors, Intel Technology Journal vol. 7, Issue 4, Nov. 14, 2003, ISSN 1535-864X, pp. 39-50, 14 pages.

Touch: TCP Control Block Interdependence, Apr. 1997, Network Working Group, Request for comments: 2140, pp. 1-9.

Stevens: TCP Slow Start, Congestion Avoidance, Fast Retransmit, and Fast Recovery Algorithms, Jan. 1997, Network Working Group, Request for Comments: 2001, pp. 1-6.

Darpa Internet Program Protocol Specification, Transmission Control Protocol, Sep. 1981, Request for comments: 793, University of SC Marina del Rey, CA 90291, 85 pages.

FreeBSD: src/sys/netinet/tcp_output.c,v 1.100.2.7 2005/05/04, @(#) tcp_output.c 8.4 (Berkeley) 5/24/9.

FreeBSD: src/sys/netinet/tcp_var.h,v 1.109.2.8 2005/05/04 @(#) tcp_var/j 8.4 (Berkeley) May 24, 1995.

Johnson et al: IXP1200 Programming The Microengine Coding Guide for the Intel Network Processor Family, Intel Press, pp. 7-36 $ 99-194.

Johnson et al: IXP2400/2800 Programing The Complete Microengine Coding Guide, Intel Press, May 20, 2003, pp. 21-72 & 195-228 & 251-274.

Carlson: Intel Internet Exchange Architecture and Applications A Practical Guide to IXP2XXX Network Processors, Intel Press, pp. 39-43 & 67-81 & 199-247.

* cited by examiner

120 →

122 → if (cwnd_factor > ssthresh_factor)
{
124 → cwnd_count = cwnd_count + 1;
126 → if (cwnd_count == cwnd_factor)
    cwnd_factor = cwnd_factor + 1; cwnd_count = 0;
}
else
{
128 → cwnd_factor = cwnd_factor + 1;
}
130 → cwnd = cwnd_factor * maxseg;

142 → if (cwnd_factor > ssthresh_factor)
{
144 → cwnd_count = cwnd_count + 1;
146 → if (cwnd_count == cwnd_factor)
        cwnd_factor = cwnd_factor + 1; cwnd = cwnd + maxseg; cwnd_count = 0;
}
else
{
148 → cwnd_factor = cwnd_factor + 1;
150 → cwnd = cwnd + maxseg;
}

FIG. 3

TRANSMISSION CONTROL PROTOCOL CONGESTION WINDOW

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols cooperate to handle the complexity of network communication. For example, a protocol known as Transmission Control Protocol (TCP) provides "connection" services that enable remote applications to communicate. That is, much like picking up a telephone and assuming the phone company will make everything in-between work, TCP provides applications with simple primitives for establishing a connection (e.g., CONNECT and CLOSE) and transferring data (e.g., SEND and RECEIVE). Behind the scenes, TCP transparently handles a variety of communication issues such as data retransmission, adapting to network traffic congestion, and so forth.

To provide these services, TCP operates on packets known as segments. Generally, a TCP segment travels across a network within ("encapsulated" by) a larger packet such as an Internet Protocol (IP) datagram. The payload of a segment carries a portion of a stream of data sent across a network. A receiver can restore the original stream of data by collecting the received segments.

Potentially, segments may not arrive at their destination in their proper order, if at all. For example, different segments may travel very different paths across a network. Thus, TCP assigns a sequence number to each data byte transmitted and includes the sequence number of the first payload byte of a segment in the segment header. This enables a receiver to reassemble the bytes in the correct order. Additionally, since every byte is sequenced, each byte can be acknowledged (ACKed) to confirm successful transmission. Thus, a receiver includes an ACK number in a TCP segment header identifying the next expected sequence number, acknowledging receipt of sequence numbers less than the ACK number.

BRIEF DESCRIPTION OF THE DRAWINGS

FIGS. 2 and 3 are listings of source code to manage a congestion window.

DETAILED DESCRIPTION

Transmission Control Protocol (TCP) provides a variety of mechanisms that enable senders and receivers to tailor a connection to the capabilities of the different devices participating in a connection and the underlying network. For example, TCP enables a receiver to specify a receive window that the sender can use to limit the amount of unacknowledged data sent. For example, during connection setup, the receiver can set a window value in a TCP segment header that corresponds to an amount of buffer space reserved for receiving connection data. The sender may maintain a send window to ensure that the amount of unacknowledged data does not exceed the receive window.

As another example, TCP permits a receiver to specify a maximum segment size header option that identifies the largest TCP segment that the receiver can handle. Again, a sender may size outgoing segments to conform to the receiver's declared maximum segment size limit.

In addition to these receiver reported capabilities, TCP uses a technique known as a "slow start" to prevent a sender from overwhelming a network when a connection begins. The slow start uses a congestion window that limits unacknowledged data transmissions to an amount that is, at least initially, much smaller than the receive window. For example, a congestion window may initially be set to one maximum segment size. While starting at a relatively small value, the congestion window can grow exponentially and soon reach the size of the receive window. For example, the congestion window size may be incremented by the maximum segment size for each non-duplicate ("new") ACK received.

Figure 1:
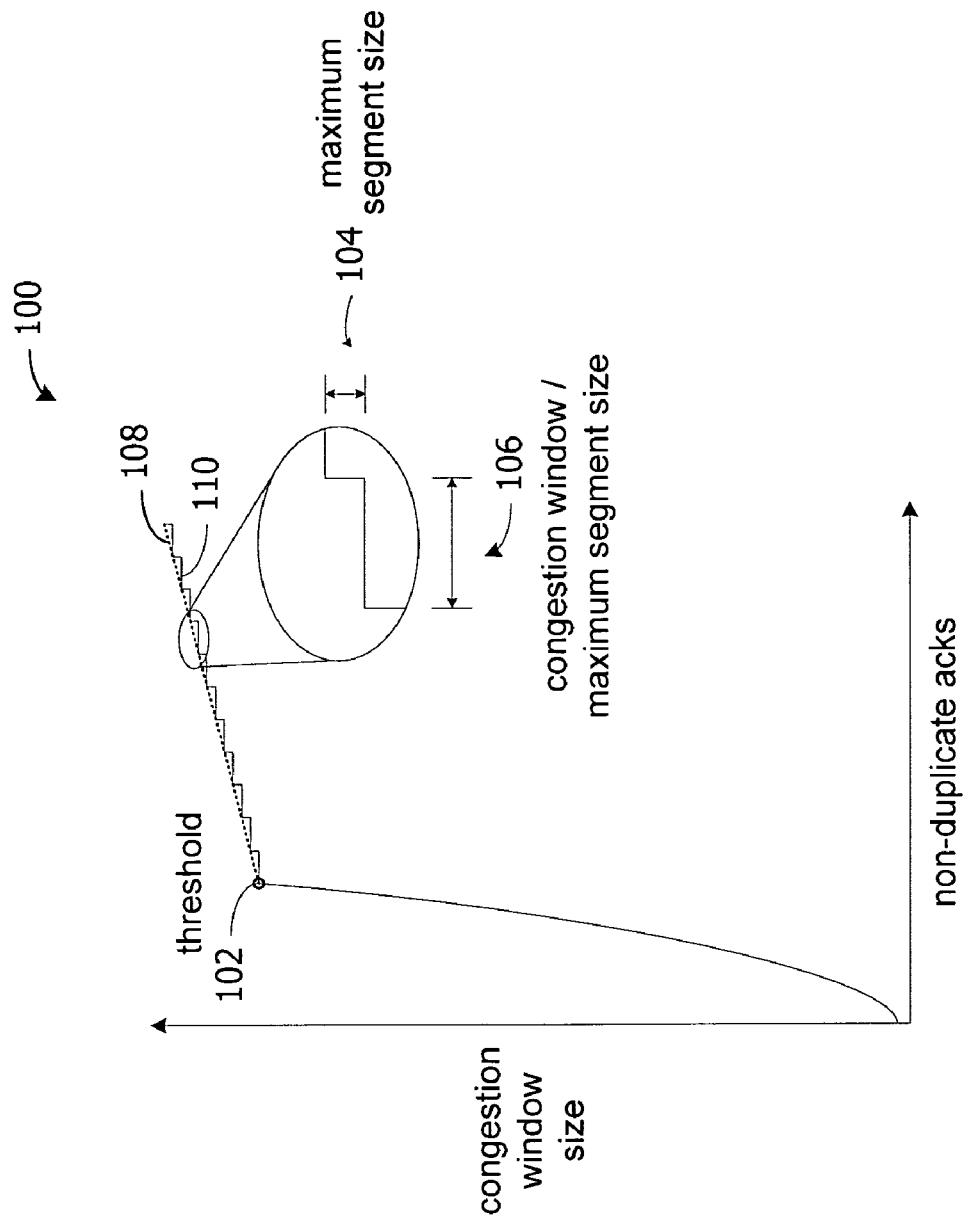
FIG. 1 is a graph illustrating management of a congestion window.

At any time, congestion may be detected by a TCP sender, for example, by receiving duplicate ACKs, detecting transmission time-outs of data sent but unacknowledged, or other techniques. To cure this congestion, a TCP sender can reduce its congestion window in an attempt to reduce traffic in a congested network. In addition, the sender can determine a slow start threshold that slows growth of the congestion window when the window reaches a size that may have overwhelmed the underlying network. After congestion detection, the congestion window can again grow exponentially until the congestion window reaches the slow start threshold. Thereafter, the sender can adjust the congestion window in smaller, more linear growth. For example, a sender may increment the congestion window by [(maximum segment size/congestion window)*maximum segment size] for each non-duplicate ACK received. Computing the division of maximum segment size by the congestion window, however, can be a very expensive operation in terms of compute cycles. Instead of this division, FIG. 1 illustrates a technique that adjusts the congestion window size in a series of maximum segment size 104 steps 110 after the slow start threshold 102 is exceeded. To contrast these steps with conventional operation, FIG. 1 depicts conventional linear growth 108 (shown as a dotted line) of a congestion window corresponding to an increase of [(maximum segment size/congestion window)*maximum segment size] for each non-duplicate ACK received. As shown, while likewise situated points within the steps 110 retain the same slope as conventional linear growth, managing the congestion window in this manner can permit avoidance of a computationally expensive division operation.

FIG. 2 depicts a sample listing of code 120 to implement "division-less" management of a congestion window. As shown, the code maintains the congestion window size ("cwnd") 130 as a multiple of the maximum segment size ("maxseg") and a congestion window factor ("cwnd_factor"). The congestion window factor ("cwnd_factor") is defined as an integer representing (congestion window size/maximum segment size). To clarify, though the congestion window factor represents the number of maximum segment size segments in the congestion window, this division is not computed. Instead, the ratio is maintained implicitly by adjustment of the congestion window factor. As shown in the code 120, the cwnd_factor increases monotonically during the TCP slow start, increasing by '1' for every non-duplicate ACK received 128.

As shown, the code 120 also represents the slow start threshold 102 as an integer value, "ssthread_factor" that represents a ratio of a slow start threshold 102 to the maximum segment size. Again, this division need not be implemented, but is implied by the handling of the "ssthread_factor". As shown, when the congestion window factor ("cwnd_factor") exceeds the ssthresh_factor 122, the code increments a congestion window count ("cwnd_count") that represents a count of non-duplicate ACKs received since a count reset. When the congestion window count ("cwnd_count") equals the congestion window factor 126, the congestion window factor is incremented by 1, the count is reset, and the congestion window is determined 130 to be an amount increased by the maximum segment size. The code 120 dispenses with largely insignificant fractional increases in the congestion window until an entire maximum segment size adjustment occurs. Since TCP typically sends data in maximum segment size segments when enough data is ready to be sent, an increase of the congestion window by a fraction of the maximum segment size does not alter the number of segments transmitted within the window. Thus, the technique avoids an expensive division while operating in an equivalent manner to an implementation that performs the division.

Generally, TCP implementations maintain state information for a connection in a set of state data known as a TCB (Transmission Control Block). The state data is generally read and updated for each segment transmitted and received, for example, to update the next expected sequence number, adjust a send window, etc. The code in FIG. 2 need not store the congestion window size in the per-connection state data. Instead the congestion window factor ("cwnd_factor") can be stored and the congestion window size can be derived as needed by multiplying 130 the congestion window factor ("cwnd_factor") with the maximum segment size ("maxseg"). Such an approach can reduce the amount of state data stored in the TCB.

The implementation of FIG. 2 can be altered to avoid multiplication by maintaining the congestion window size in a connection's state data. For example, FIG. 3 depicts a listing of source code 140 that adds a maximum segment size amount 140 to the congestion window ("cwnd") with each increment of the congestion window factor (cwnd_factor). This implementation avoids both multiplication and division and has the same behavior as the code shown in FIG. 2. The implementation shown in FIG. 3 may be better suited to an architecture that does not have multiplication and division instructions.

Figure 4:
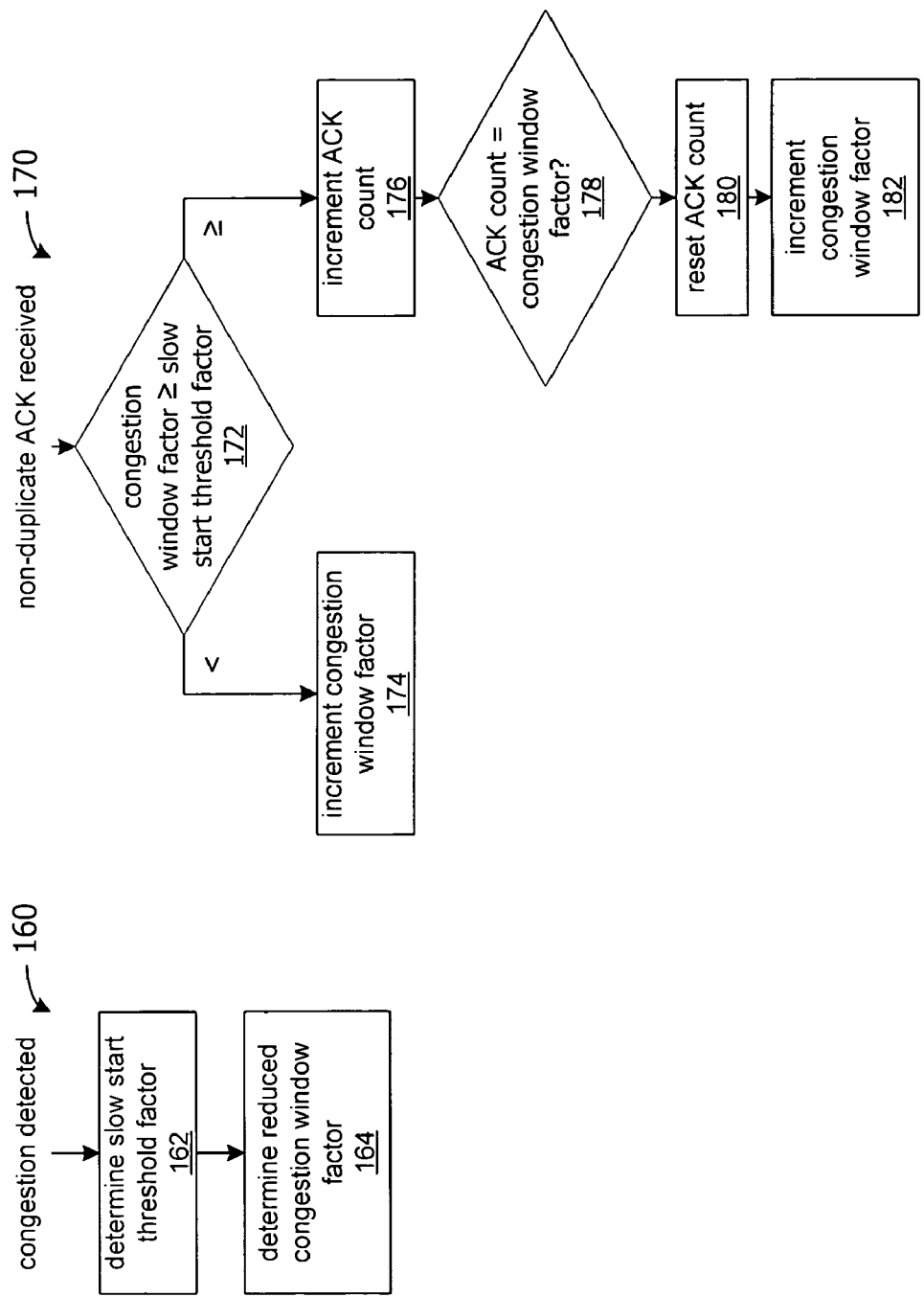
FIG. 4 illustrates flow-charts of processes to manage a congestion window.

FIG. 4 depicts flow-charts 160, 170 illustrating sample operation. As shown, a non-duplicate ACK causes comparison 172 of the congestion window factor with the slow start threshold factor. If the congestion window factor is less than the threshold, the process 170 implements the conventional exponential slow start by incrementing the congestion window factor 174. Otherwise, the process 170 increments an ACK count 176 for the non-duplicate ACK. If the count equals the congestion window factor 178, the count is reset 180, and the congestion window factor 182 is incremented. The congestion window size can then be altered (e.g., using the techniques illustrated in FIG. 2 or FIG. 3).

As shown, a TCP sender may respond 160 to detected congestion. In this case, a slow start threshold factor is determined 162. For example, a slow start threshold may be computed by floor (½ [(min (congestion window size, receive window size)]/maximum segment size). Alternately, such a computation may be determined based on a representation of the congestion window and receive window as factors as described above (e.g., floor (½ [min (congestion window factor, receive window factor)])). In addition, the sender may 164 reduce the congestion window factor and/or congestion window size to permit the underlying network to recover.

Figure 5:
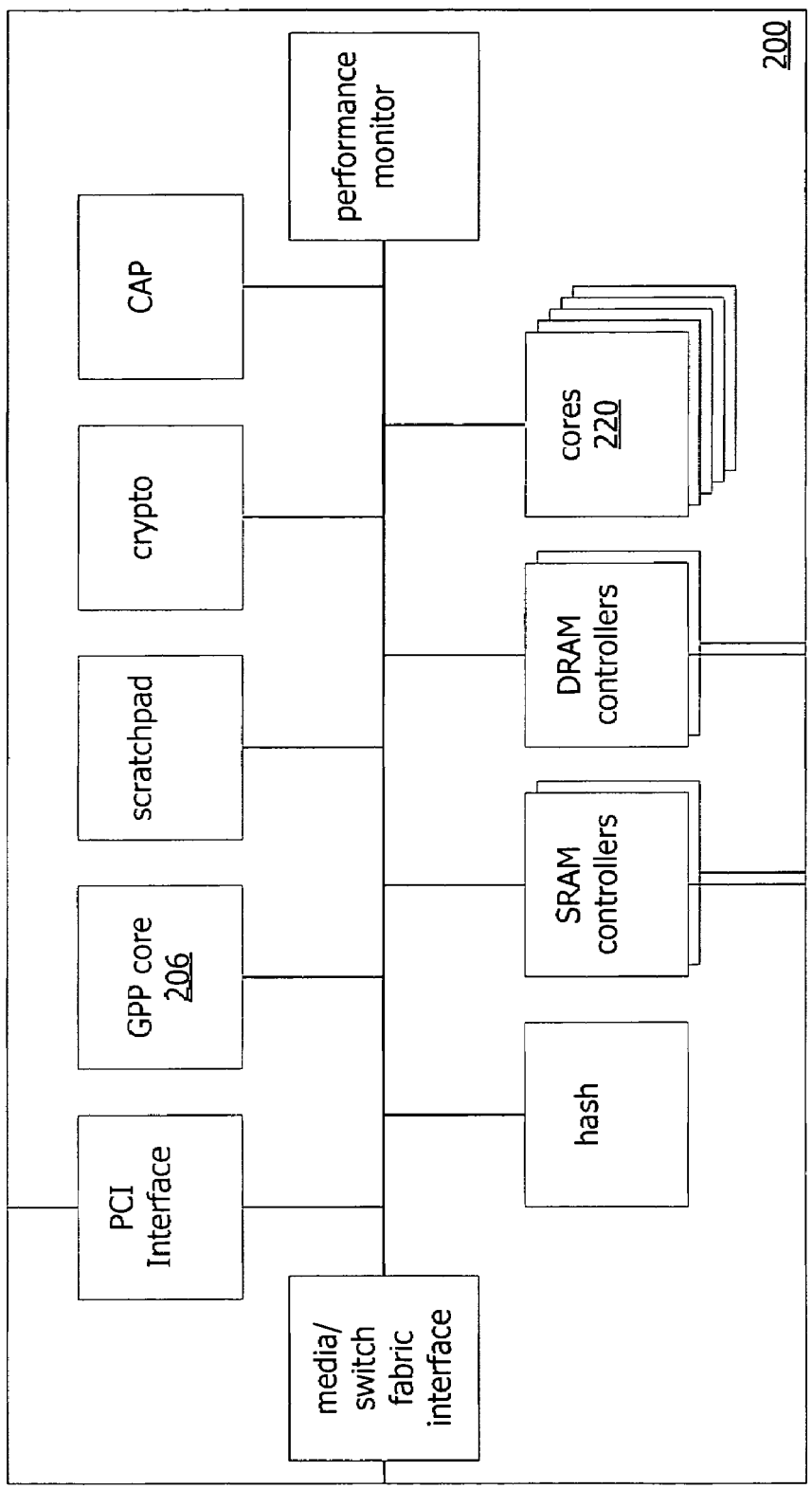
FIGS. 5 and 6 are diagrams of processors having multiple cores.
Figure 6:
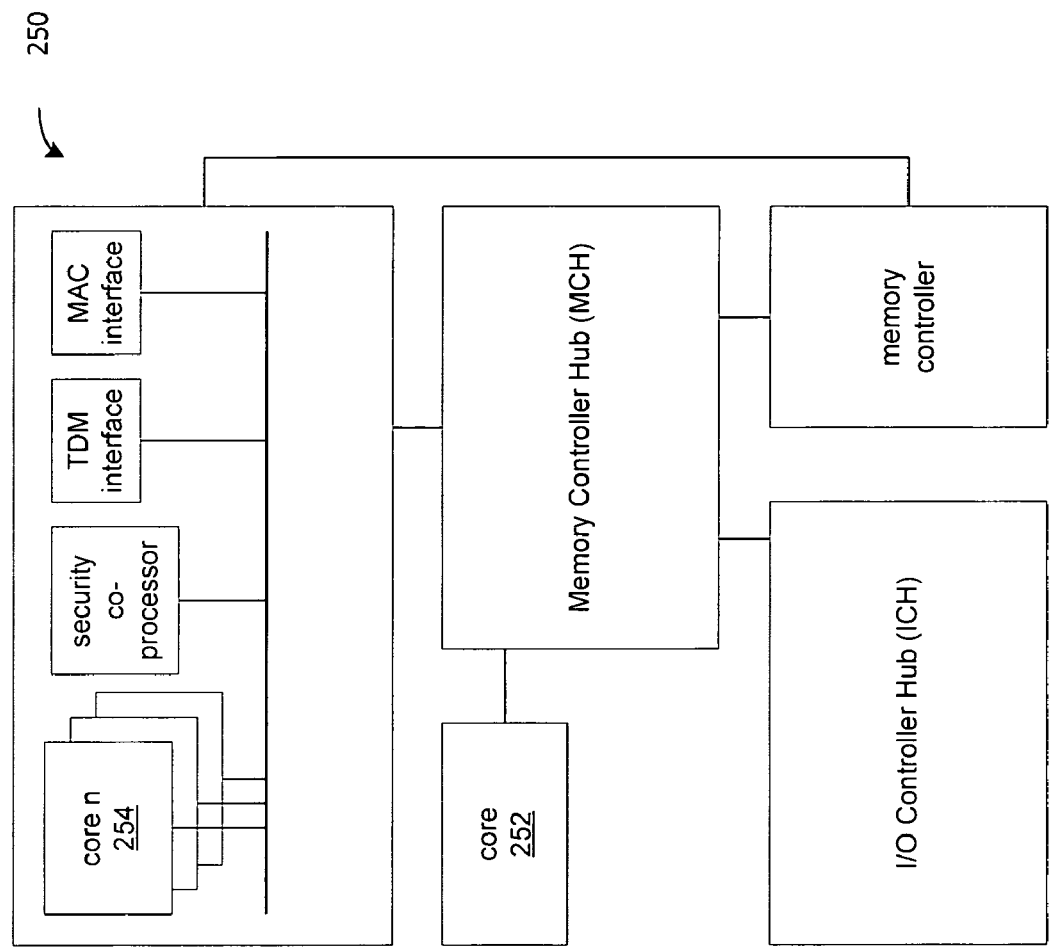

The techniques describe above can be implemented in a variety of ways and in different environments. For example, the techniques may be implemented with a network processor. As an example, FIG. 5 depicts an example of a network processor 200 that can be programmed to process packets. The network processor 200 shown is an Intel® Internet eXchange network Processor (IXP). Other processors feature different designs. The network processor 200 shown features a collection of programmable processing cores (e.g., programmable engines 220 and general purpose core 206) on a single integrated semiconductor die. Each engine 220 may be a Reduced Instruction Set Computer (RISC) processor tailored for packet processing. For example, the engine 220 may not provide floating point or integer division instructions commonly provided by the instruction sets of general purpose processors. Individual engines 220 may provide multiple threads of execution. For example, a engines 220 may store multiple program counters and other context data for different threads. FIG. 6 depicts another multi-core processor 250 that features multiple engines 254 and a general purpose core 252 that share a memory controller hub, I/O controller hub (e.g., PCI interface), and memory controller.

Both processors 200, 250 may be coupled to or include Media Access Devices (MACs) to receive network data (e.g., a wireless or Ethernet MAC). In both processors 200, 250, TCP processing may be offloaded to one or more of the cores. Such cores may not feature division instructions. In such circumstances the congestion management techniques can save substantial compute cycles over techniques that implement division as repeated subtractions and/or shifting. For example, implementing the techniques described above can potentially reduce congestion window computations from 235 cycles to 15 cycles. This low-cycle consumption can, for example, help a processor attain 10-Gigabit/s wire-speed processing.

While FIGS. 5-6 described specific examples of processors, the techniques may be implemented in a variety of architectures having designs other than those shown.

Techniques described above can be implemented in a wide variety of circuitry (e.g., ASICs (Application Specific Integrated Circuits), PGA (Programmable Gate Arrays), and so forth). The term circuitry as used herein includes digital circuitry and analog circuitry. The circuitry design may be generated by encoding logic described above in a hardware description language (e.g., Verilog or VHDL). The circuitry may also include programmable circuitry. The programmable circuitry may include a processor that operates on computer programs, disposed on computer readable storage mediums.

Other embodiments are within the scope of the following claims.

What is claimed is:

1. A processor-implemented method, comprising:
   incrementing an acknowledgement (ACK) count for non-duplicate Transmission Control Protocol ACKs received by a Transmission Control Protocol sender in a connection between the Transmission Control Protocol sender and a Transmission Control Protocol receiver;
   comparing the ACK count to a congestion window factor representing the ratio of a congestion window size associated with a connection to a maximum segment size associated with the connection;

based on the comparing, incrementing the congestion window factor; and wherein the incrementing the ACK count and incrementing the congestion window factor comprise incrementing in accordance with the following logic:

```
if (cwnd_factor > ssthresh_factor)
{
    cwnd_count = cwnd_count + 1;
    if (cwnd_count == cwnd_factor)
        cwnd_factor = cwnd_factor + 1; cwnd_count = 0;
}
else
{
    cwnd_factor = cwnd_factor + 1;
}
``` where
- cwnd_factor is an integer representing the congestion window size divided by the maximum segment size;
- ssthresh_factor is an integer representing a slow start threshold size divided by the maximum segment size; and
- cwnd_count is the count of non-duplicate ACKs received.

2. The method of claim 1, further comprising determining a new value for the congestion window size.

3. The method of claim 2, wherein the determining the new value for the congestion window size comprises an add operation of the congestion window size and the maximum segment size.

4. The method of claim 2, wherein the determining the new value for the congestion window size comprises a multiplication operation of the congestion window factor and the maximum segment size.

5. The method of claim 2, wherein the determining the new value for the congestion window size comprises determining without a division operation of the congestion window size by the maximum segment size.

6. The method of claim 1, further comprising determining if a congestion window threshold has been exceeded.

7. The method of claim 6, wherein the congestion window threshold comprises an integer representing the ratio of a congestion window threshold size to the maximum segment size.

8. The method of claim 7, further comprising if the congestion window threshold has not been exceeded, increasing a congestion window size associated with the connection by the maximum segment size for each non-duplicate ACK received.

9. A computer program product comprising a computer readable storage medium with instructions stored thereon for causing a processor to:
- increment an acknowledgement (ACK) count for non-duplicate Transmission Control Protocol ACKs received by a Transmission Control Protocol sender in a connection between the Transmission Control Protocol sender and a Transmission Control Protocol receiver;
- compare the ACK count to a congestion window factor representing the ratio of a congestion window size associated with a connection to a maximum segment size associated with the connection;
- based on the comparing, increment the congestion window factor; and wherein the instructions comprise instructions implementing the following logic:

```
if (cwnd_factor > ssthresh_factor)
{
    cwnd_count = cwnd_count + 1;
    if (cwnd_count = = cwnd_factor)
        cwnd_factor = cwnd_factor + 1; cwnd_count = 0;
}
else
{
    cwnd_factor = cwnd_factor + 1;
}
cwnd = cwnd_factor * maxseg;
``` where
- cwnd_factor is an integer representing the congestion window size divided by the maximum segment size;
- ssthresh_factor is an integer representing a slow start threshold size divided by the maximum segment size;
- cwnd_count is the count of non-duplicate ACKs received; and
- maxseg is the maximum segment size.

10. The computer program product of claim 9, further comprising instructions for causing the processor to determine a new value for the congestion window size.

11. The computer program product of claim 10, wherein the instructions for causing the processor to determine the new value for the congestion window size comprise instructions for causing the processor to perform an add operation of the congestion window size and the maximum segment size.

12. The computer program product of claim 10, wherein the instructions for causing the processor to determine the new value for the congestion window size comprise instructions for causing the processor to perform a multiplication operation of the congestion window factor and the maximum segment size.

13. The computer program product of claim 9, further comprising instructions for causing the processor to determine if a congestion window threshold has been exceeded.

14. The computer program product of claim 13, wherein the congestion window threshold comprises an integer representing the ratio of a congestion window threshold size to the maximum segment size.

15. The computer program product of claim 13, further comprising instructions for causing the processor to, if the congestion window threshold has not been exceeded, increase a congestion window size associated with the connection by the maximum segment size for each non-duplicate ACK received.

* * * * *